UNITED STATES PATENT OFFICE.

WILLIAM G. WEY, OF OSWEGO, NEW YORK, ASSIGNOR TO THE DIAMOND MATCH COMPANY, OF CHICAGO, ILLINOIS, A CORPORATION OF ILLINOIS.

TREATED MATCH-SPLINTS AND PROCESS OF PRODUCING THE SAME.

1,191,545. Specification of Letters Patent. Patented July 18, 1916.

No Drawing. Original application filed November 7, 1912, Serial No. 729,971. Divided and this application filed September 22, 1915. Serial No. 51,950.

*To all whom it may concern:*

Be it known that I, WILLIAM G. WEY, a citizen of the United States, and resident of the city and county of Oswego and State of New York, formerly of Barberton, in the county of Summit and State of Ohio, have invented certain new and useful Improvements in Treated Match-Splints and Processes of Producing the Same, of which the following is a specification.

The present application is a division of an application filed by me November 7th, 1912, under Serial No. 729,971.

This invention comprises a method of treating match splints, whereby they are economically and efficiently impregnated with a material or materials adapted to aid the transmission of the flame from the match-head composition to the splints, and with a material or materials adapted to render the splints, non-glowing after they have been ignited and extinguished.

The invention also comprises the splints thus impregnated.

In carrying out my invention in a simple, efficient and economical manner, I select an inorganic material having the requisite characteristics; dissolve it in a substance miscible with melted paraffin wax, or other analogous flame-transmitting substance, and then incorporate the mixture with such wax or substance.

The preferred inorganic material which I employ is orthophosphoric acid ($H_3PO_4$), and the preferred substance in which it is dissolved is cottonseed oil; the mixture being prepared in any suitable manner. Thus, for example, a saturated solution of orthophosphoric acid in cottonseed oil is prepared by adding five per centum of the acid to the oil, agitating the mixture at frequent intervals, and then allowing the mixture to stand about twelve hours. A proportion of the stated amount of acid will not dissolve in the oil, and, upon being allowed to stand, will settle to the bottom, with the solution of acid in oil floating on top. The supernatant liquid of oil containing orthophosphoric acid is carefully poured off and added to melted paraffin wax, in the proportion of fifteen per cent. by volume of the acid and oil mixture to 85 per cent. of the said wax. The solution or bath thus made, will be seen to contain as a flame-transmitting vehicle, an unctuous hydrocarbon material, such as paraffin, mixed with a solution of a glow-proofing phosphorus compound (or a compound capable of preventing glowing of the splint, after the flame is extinguished) such as phosphoric acid, in a solvent for this material, such as cotton seed oil. Obviously if the bath is to consist of a solution, the glow-proofing compound must be soluble in the mixture of vehicle and solvent.

In treating the match splints, as in the usual practice, I preferably dip the entire splint, or at least a considerable portion of its length (and not merely the head, as in the match-heading operation) into the bath or solution. Match splints dipped into this solution maintained at a temperature of about 275° Fahr., and then removed, possess the inflammable properties ordinarily given by paraffin wax, and also the non-glowing properties ordinarily imparted by a separate solution of boracic acid, or other inorganic materials having a similar action on the splints.

My invention contemplates a match in which the unctuous solvent for the inorganic material constitutes the flame-transmitting vehicle, as well as the process of producing the same. In that case, for example, the inorganic material may comprise orthophosphoric acid, and the solvent therefor be cottonseed oil; the mixture being prepared in any suitable manner. Thus, a saturated solution of orthophosphoric acid in cottonseed oil is prepared by adding about two per cent. of the acid to the oil, agitating the mixture at intervals until the oil has taken up all the acid. If match splints be dipped in the resulting solution they will become impregnated with both ingredients and thus possess the desired flaming and non-glowing properties.

It is to be understood that I do not limit my invention to the specific organic and inorganic materials herein described; nor to the specific illustrative mode or modes of preparing the composition or mixture; as other organic and inorganic materials and other methods of preparation may be employed without departure from the fair spirit of my invention. The composition of paraffin, cottonseed oil and phosphoric acid (or equivalents thereof) herein described is claimed in the parent application above noted.

I claim:—

1. A method of treating match splints, which consists in impregnating at least a considerable portion of the length of the same with a solution comprising an anti-glowing inorganic material, a solvent therefor, and a flame transmitting vehicle miscible with said solvent.

2. A method of treating match splints, which consists in impregnating at least a considerable portion of the length of the same with a solution comprising a phosphorus compound, a solvent therefor, and a flame transmitting vehicle miscible with said solvent.

3. A method of treating match splints, which consists in impregnating at least a considerable portion of the length of the same with a solution comprising a phosphorus compound, a solvent therefor, and a hydrocarbon.

4. A method of treating match splints, which consists in impregnating at least a considerable portion of the length of the same with a solution comprising a phosphorus compound dissolved in an oil.

5. A method of treating match splints, which consists in impregnating at least a considerable portion of the length of the same with a solution comprising a phosphorus compound dissolved in a substance miscible with molten paraffin wax.

6. A method of treating match splints, which consists in impregnating the same with a solution comprising orthophosphoric acid dissolved in an oil.

7. A method of treating match splints, which consists in impregnating the same with a solution comprising orthophosphoric acid dissolved in a substance miscible with molten paraffin wax.

8. A method of treating match splints, which consists in impregnating the same with a solution comprising a phosphorus compound dissolved in oil and mixed with a petroleum derivative liquid at the temperature of the impregnating operation.

9. A method of treating match splints, which consists in impregnating the same with a solution comprising a phosphorus compound dissolved in cottonseed oil and mixed with molten paraffin wax.

10. A match splint having at least a considerable portion of its length impregnated with a solution comprising a phosphorus compound dissolved in oil.

11. A match splint having at least a considerable portion of its length impregnated with a solution comprising a phosphorus compound dissolved in an oil liquid at the ordinary temperature, and mixed with a petroleum derivative having a melting point below that at which said oil would be decomposed.

12. A match splint impregnated with a solution consisting of a phosphorus compound dissolved in oil and mixed with molten paraffin wax.

13. A match splint impregnated with a solution consisting of orthophosphoric acid dissolved in cottonseed oil and mixed with molten paraffin wax.

14. A match splint impregnated with a solution comprising an anti-glowing inorganic material, a solvent therefor, and an unctuous flame transmitting vehicle miscible with said solvent.

15. A match splint impregnated with a vehicle having flame-transmitting properties, carrying an inorganic phosphorus compound having glow-extinguishing properties in solution therein.

16. A method of treating match splints, which comprises impregnating the same with a vehicle having flame-transmitting properties, and an inorganic phosphorus compound having glow extinguishing properties, soluble in said vehicle.

17. A match splint having at least a considerable portion of its length impregnated with a solution comprising a phosphorus compound dissolved in an oil, said phosphorus compound being present in amount sufficient to materially lower the glow-retaining properties of said splint.

18. The process of treating match splints to impart flaming and non-glowing properties thereto, which consists in subjecting at least a considerable portion of the length of said splints to a solution of a phosphorus compound in an unctuous inflammable vehicle.

19. A process of treating match splints, to impart flaming and non-glowing properties thereto, which comprises subjecting at least a considerable portion of the length of said splints to a solution containing a phosphorus compound dissolved in a menstruum comprising melted paraffin.

20. The improvement in the art of treating match splints to render them non-glowing, which comprises providing a bath of an unctuous material which will serve as a vehicle for the efficient transmission of flame from the igniting material to the body of the splints, and a glow-proofing phosphorus compound soluble therein, and dipping at least a considerable portion of the length of said splints into said bath.

21. The improvement in the art of treating match splints to render the same non-glowing, which comprises providing a bath containing molten paraffin and a glow-proofing phosphorus compound soluble therein, and dipping at least a considerable portion of the length of said splints, into the said bath.

Signed at Oswego in the county of Oswego and State of New York this 20th day of Sept. A. D. 1915.

WILLIAM G. WEY.